United States Patent
Elahmadi et al.

(10) Patent No.: US 6,735,392 B1
(45) Date of Patent: May 11, 2004

(54) SYSTEM AND METHOD FOR TRANSMITTING AND RESTORING AN OPTICAL SIGNAL

(75) Inventors: Siraj Elahmadi, Dallas, TX (US); Paul A. Bullock, Plano, TX (US); Nigel Baker, Harlow (GB); Kesavamurthy Nagaraj, Plano, TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/420,329

(22) Filed: Oct. 18, 1999

(51) Int. Cl.⁷ .................................................. G02F 1/00
(52) U.S. Cl. ..................... 398/7; 398/1; 398/4; 398/20; 398/34
(58) Field of Search ........................... 359/119; 370/369, 370/224, 225, 360, 404, 907; 398/7, 4; 385/12

(56) References Cited

U.S. PATENT DOCUMENTS

| | | | | |
|---|---|---|---|---|
| 5,406,549 A | * | 4/1995 | Kremer ....................... | 370/224 |
| 5,777,761 A | * | 7/1998 | Fee .............................. | 359/110 |
| 5,933,258 A | * | 8/1999 | Flanagan et al. ............ | 359/110 |
| 6,046,833 A | * | 4/2000 | Sharma et al. .............. | 359/110 |
| 6,154,296 A | * | 11/2000 | Elahmadi et al. ........... | 359/110 |
| 6,282,334 B1 | * | 8/2001 | Hodgson et al. ............. | 385/12 |
| 6,331,906 B1 | * | 12/2001 | Sharma et al. .............. | 359/110 |
| 6,570,872 B1 | * | 5/2003 | Beshai et al. ................ | 370/369 |

FOREIGN PATENT DOCUMENTS

| | | |
|---|---|---|
| EP | 0 752 794 A2 | 1/1997 |
| WO | WO 99/23773 | 11/1998 |

OTHER PUBLICATIONS

U.S. Ser. No. 08/964,823 filed Nov. 5, 1997 entitled Telecommunications Network Having Shared Protect Capacity Architecture (1 sheet of abstract, 3 sheets of drawings).

(List continued on next page.)

*Primary Examiner*—Jason Chan
*Assistant Examiner*—David C. Payne
(74) *Attorney, Agent, or Firm*—Haynes and Boone, LLP (57) ABSTRACT

A system and method for transmitting and restoring an optical signal in an optical ring is presented. The optical ring comprises a plurality of nodes, each node containing an optical cross connect switching fabric coupled to a data switch. The optical cross connect switching fabric and the data switch are coupled to a short reach side of a wavelength translation device. A long reach side of the wavelength translation device is coupled to a dense wave division multiplex (DWDM) coupler. The optical cross connect switching fabric and the data switch include a protect channel and a working channel for transporting the optical signal. The wavelength translation device receives the optical signal at a high speed rate, where the optical signal is a short reach optical signal and originates from a high speed interface on the data switch. The wavelength translation device then maps the short reach optical signal into a long reach DWDM optical signal at the high speed rate and forwards, via the DWDM coupler, the long reach optical signal to an adjacent DWDM coupler located at an adjacent node. If a link failure occurs and has not recovered, and the protect channel is not available, optical cross connect switching fabrics at adjacent nodes on each side of the failed link switch the optical signal to an alternate diverse protect port. An optical pass through of the switched optical signal between any transit nodes in the optical ring is then configured resulting in a restoration path for the working channel.

20 Claims, 6 Drawing Sheets

OTHER PUBLICATIONS

Bullock, Paul, et al., "Analysis and Implementation of Optical Restoration Strategies in Mesh and Ring Transport Architectures", Nortel Networks, Richardson, Texas.

Berger et al., "Pan–European Optical Networking Using Wavelength Division Multiplexing", IEEE Communications Magazine, Apr. 1997, p. 82–88.

Fang et al., "All–Optical Four–Fiber Bidirectional Line–Switched Ring", Journal of Lightwave Technology, vol. 17, No. 8, Aug. 1999, p. 1302–1308.

Goldstein et al., "Multiwavelength Opaque Optical–Crossconnect Networks", IEICE Trans Electron, vol. E82, No. 8, Aug. 1999, p. 1361–1369.

Stern et al., "Mutliwavelength Optical Networks: A Layered Approach" May 1999, p. 607–664.

* cited by examiner

SYSTEM AND METHOD FOR TRANSMITTING AND RESTORING AN OPTICAL SIGNAL

CROSS REFERENCE TO RELATED APPLICATIONS

This application is related to U.S. patent application Ser. No. 08/946,823, filed on Nov. 5, 1997, entitled TELECOMMUNICATIONS NETWORK HAVING SHARED PROTECT CAPACITY ARCHITECTURE, assigned to the assignee of the present application, and hereby incorporated by reference herein.

This application is also related to U.S. patent application Ser. No. 09/419,653, filed on even date herewith, entitled COMMUNICATION NETWORK FOR TRANSMITTING AND RESTORING AN OPTICAL SIGNAL, assigned to the assignee of the present application, and hereby incorporated by reference herein.

BACKGROUND

This application relates generally to optical communication systems and, more particularly, to a system and method for transmitting and restoring optical signals.

A conventional method for transmitting optical signals is disclosed in U.S. Pat. No. 5,933,258 by Flanagan et al. This conventional method utilizes terminals, at a node, that multiplex fine granularity signals (such as STM-1, OC-12, etc.) from SONET, SDH, or other transport protocols, into coarse granularity signals (such as STM-16, OC-192, etc.) that are forwarded to an optical cross connect (OXC) switch. The signals are then transmitted to a terminal at another node in the optical communication system. In order for the signal to reach the terminal, it may have to be amplified or regenerated. The regenerator, at the OXC switch, converts optical signals into the electrical domain, performs various actions on the signals such as, for example, re-synchronizing the signal with the stratum clock, and then reconverts and re-amplifies the signals back into the optical domain. Furthermore, wavelength detectors are utilized at the regenerator to ensure the correct signal is always being transmitted for a particular route.

Such prior art approaches have a number of limitations. One such limitation is that a wavelength detection scheme must be implemented at all regeneration sites to ensure a proper reception of protection signals. The proper reception of the protection signals is needed to ensure that wavelength contingency (which is caused when a wavelength travels in an incorrect direction around the optical ring, from, for example, a link cut) does not occur. Additionally, optical signals incur significant power loss as they transit through the optical switching fabric at transit nodes or origination and destination nodes.

Further, as data centric switching products (such as routers and Asynchronous Transfer Mode (ATM) switches) emerge, the SONET interfaces from such products will increase in speed (e.g., from OC-48 to OC-192). This will lead to an inefficient handling of the optical signal traffic because the conventional interfaces (or tributary access) on SONET/SDH multiplexing equipment typically accept only low speed traffic (such as STM-1, OC-12, etc.). This traffic must then be multiplexed to create a high enough bit rate to justify long distance optical transmission thereby introducing a further limitation.

Another limitation of the prior art regards the fact that the conventional optical ring must be balanced by including the same number of working channels and protection channels between each node. Certain nodes, however, may not need as many working channels and protection channels as other nodes might because, for example, the traffic between these nodes may not be as heavy as the traffic between the other nodes. As such, the conventional optical ring may utilize a higher number of terminals than needed increasing the cost and complexity of the system.

Therefore, an improved system and method for transmitting and restoring an optical signal is desired to reduce or eliminate these limitations and design complexities.

SUMMARY

In response to these and other limitations, provided herein is a unique system and method for transmitting and restoring an optical signal in an optical ring. The optical ring includes nodes, each containing an optical cross connect switching fabric that is coupled to a data switch. The optical cross connect switching fabric and the data switch are further coupled to a short reach side of at least one wavelength translation device and a long reach side of the wavelength translation device is coupled to a dense wave division multiplex (DWDM) coupler. The optical cross connect switching fabric and the data switch include at least one protect channel and at least one working channel for transporting the optical signal.

In one embodiment, the wavelength translation device receives the optical signal at a high speed rate, where the optical signal is a short reach optical signal and originates from a high speed interface on the data switch. The wavelength translation device then maps the short reach optical signal into a long reach DWDM optical signal at the high speed rate and forwards, via the DWDM coupler, the long reach optical signal to an adjacent DWDM coupler located at an adjacent node.

In some embodiments, if the long reach optical signal requires amplification between the nodes, the optical amplifier amplifies the long reach optical signal, where the optical amplifier is coupled between the plurality of nodes (for example, to the DWDM coupler and to the adjacent DWDM coupler).

In some embodiments, if the long reach optical signal requires improved signal quality, a regenerator regenerates the long reach optical signal, where regenerator is coupled between the plurality of nodes In some embodiments, if a failure occurs on a link transporting the working channel, the protect channel is utilized to transport the optical signal.

In some embodiments, if the failure has recovered, the working channel is utilized.

In some embodiments, if the failure has not recovered and the protect channel is not available, optical cross connect switching fabrics at adjacent nodes on each side of the failed link switch the optical signal to an alternate diverse protect port.

In some embodiments, an optical pass through of the switched optical signal is configured between any transit nodes in the optical ring.

In some embodiments, if the failure has recovered, switching the optical signal back to the working channel.

These advantages, as well as others which will become apparent, are described in greater detail with respect to the drawings and the following disclosure.

DETAILED DESCRIPTION

Figure 1:
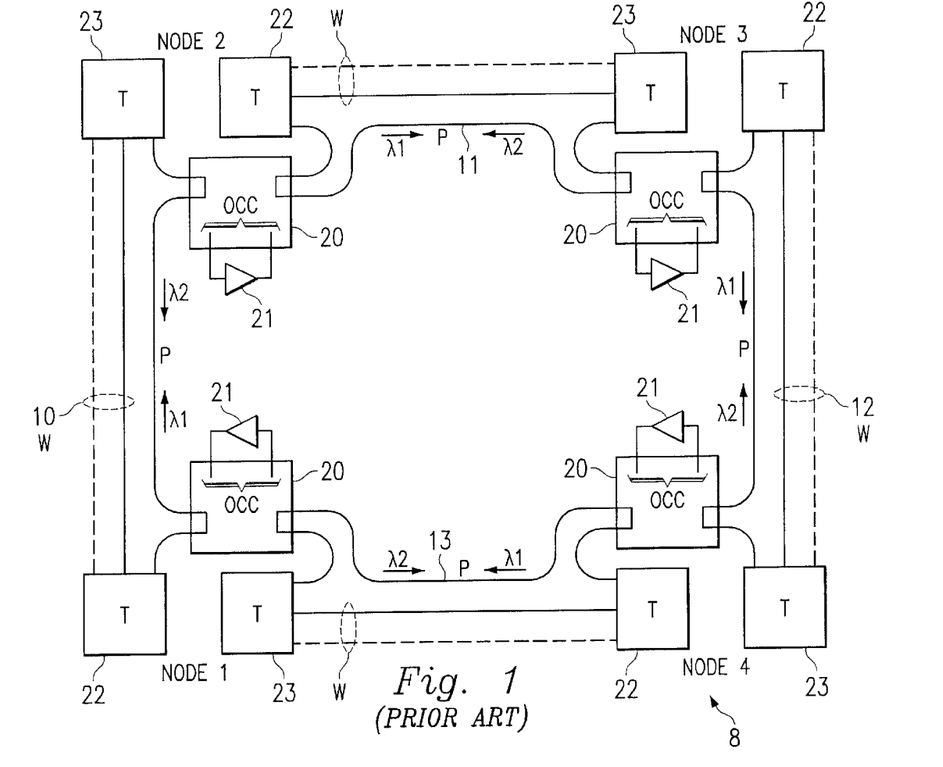
FIG. 1 is a prior art diagrammatic view of an optical system.

FIG. 1 depicts a prior art optical communication system 8 that includes a plurality of nodes 1–4 which further include a plurality of terminals 22 and 23 coupled to a plurality of optical cross connect (OCC or OXC) switches 20. The OXC's 20, among other actions, route optical signals.

Figure 2:
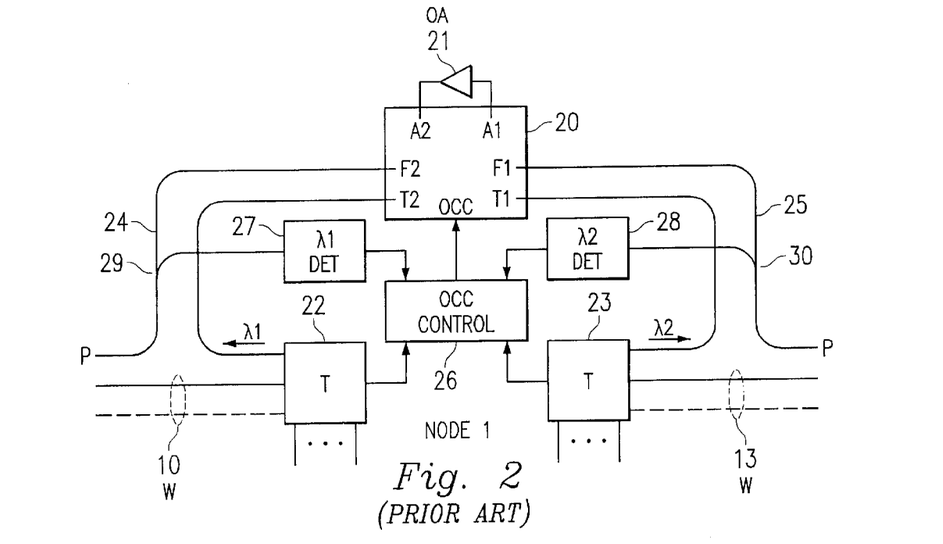
FIG. 2 is a prior art diagrammatic view of a node in the prior art optical system.

FIG. 2 depicts a node, for example node 1 (although nodes 2–4 may also be described in a similar manner). Node 1 includes an OXC 20 that has optical ports T1, F1, A1, T2, F2, and A2. A bi-directional optical amplifier 21 is coupled via optical fibers between the ports A1 and A2. The node includes two terminals T 22 and 23 to which the optical fiber(s) of the bi-directional working channel(s) W of the respective communication links (such as 10 and 13 for node 1) are coupled as illustrated in FIG. 1. The bi-directional protection channel P of one communication link, 10 as illustrated, is coupled via an optical fiber 24 to the OXC port F2, and the bi-directional protection channel P of the other communication link, 13 as illustrated, is coupled via an optical fiber 25 to the OXC port F1. The protection channel optical ports of the terminals 22 and 23 are coupled via optical fibers to the OXC ports T2 and T1 respectively. As illustrated, one of the terminals 22 transmits on one of the optical wavelengths $\lambda 1$ (and receives on the other wavelength $\lambda 2$), and the other terminal 23 transmits on the other wavelength $\lambda 2$ (and receives on the one wavelength $\lambda 1$).

The node of FIG. 2 may further include an OXC control unit 26 and two wavelength detectors 27 and 28 each of which can comprise an optical signal detector coupled to a wavelength filter for a wavelength to be detected in an incoming optical signal. The wavelength detector 27 is directionally coupled at 29 to the optical fiber 24 and serves for detecting the wavelength $\lambda 1$ in the optical signal incoming to this fiber and hence to the node 1 on the protection channel P of the communication link 10. Conversely, the wavelength detector 28 is directionally coupled at 30 to the optical fiber 25 and serves for detecting the wavelength $\lambda 2$ in the optical signal incoming to this fiber and hence to the node 1 on the protection channel P of the communication link 13. The OXC control unit 26 is responsive to electrical output signals from the wavelength detectors 27 and 28, and or to electrical alarm signals from the terminals 22 and 23, to control the OCC 20 in a desired manner.

The optical amplifier 21 may further be replaced by an optical bi-directional regenerator between the OXC ports A1 and A2 or by a simple optical fiber connection between these ports depending on the optical signal strength. The bi-directional regenerators may also be placed on the communication links 10–13 of FIG. 1.

Figure 3:
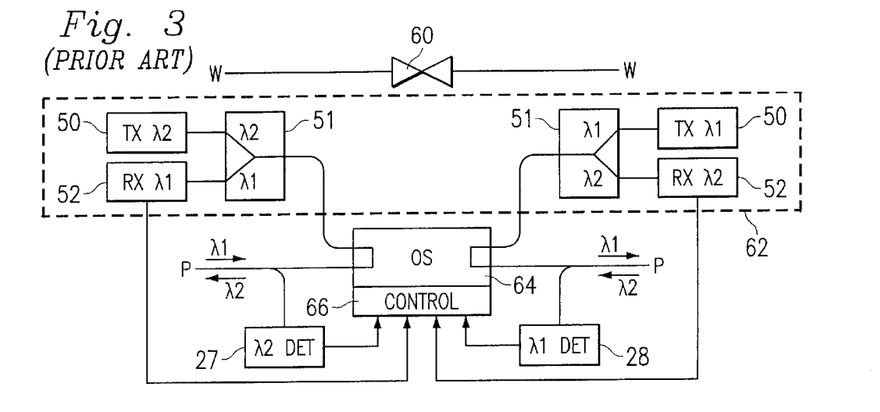
FIG. 3 is a prior art diagrammatic view of a regenerator in the prior art node.

FIG. 3 illustrates, for example for the communication link 11 between the nodes 2 and 3, a regenerator 60 for one working channel W optical fiber, and in more detail, a regenerator 62 provided for the protection channel P optical fiber. Each regenerator comprises, as shown for the regenerator 62, two units each comprising a transmitter 50, a wave division multiplex coupler 51, and a receiver 52. One unit transmits at the wavelength $\lambda 1$ and receives at the wavelength $\lambda 2$, while the other unit transmits at the wavelength $\lambda 2$ and receives at the wavelength $\lambda 1$. The regenerator 60 is coupled to the working channel fiber in a conventional manner and to the protection channel fiber via a 2-port 2-way optical switch 64. The optical switch 64 includes a control unit 66 which is controlled by alarm signals from the receivers 52 and/or by $\lambda 1$ and $\lambda 2$ wavelength detectors 27 and 28 which are directionally coupled to the protection channel fiber. Due to the placement of the optical switches 64, wavelength contingencies may arise from, for example, a link cut. In such a situation, the wavelengths $\lambda 1$ and $\lambda 2$ may travel opposite their normal direction potentially causing the wavelength detector 27 to detect wavelength $\lambda 2$ (instead of $\lambda 1$ as discussed in FIG. 2) and wavelength detector 28 to detect wavelength $\lambda 1$ (instead of $\lambda 2$). The wavelength detectors 27 and 28 would then need to send a command to the optical switch to swap the signals ($\lambda 1$ and $\lambda 2$).

As can be seen from the above description of the prior art, the conventional optical communication system includes terminals, wavelength detectors at the regenerators, and regenerators at the OXC switch.

Figure 4:
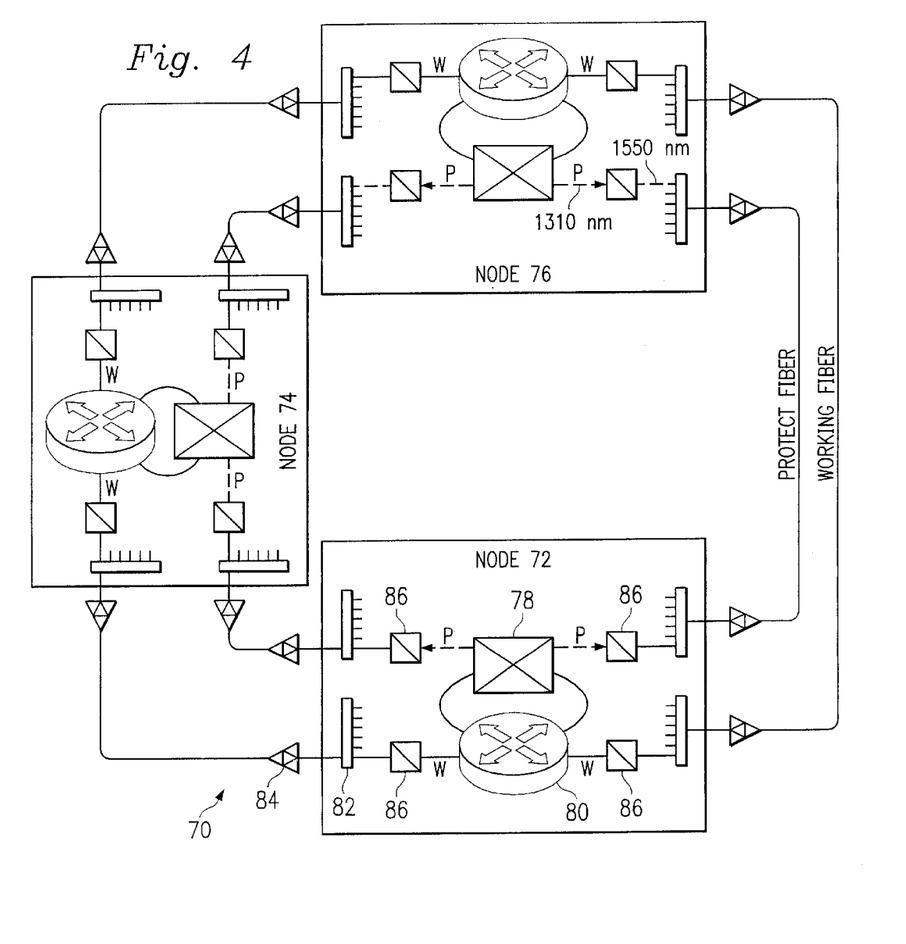
FIG. 4 is a diagrammatic view of an optical system of the present invention.

FIG. 4 depicts an optical communication system or ring 70 for implementing one embodiment of the present invention. The optical ring 70 includes nodes 72–76, each containing an optical cross connect switching fabric (or OXC switch) 78 that is coupled to a data switch 80. The optical cross connect switching fabric 78 and the data switch 80 are further coupled to a short reach side of at least one wavelength translation device (or transponder) 86 and a long reach side of the wavelength translation device is coupled to a dense wave division multiplex (DWDM) coupler 82. The optical cross connect switching fabric 78 and the data switch 80 include at least one protect channel (P) 76 (or port) and at least one working channel (W) 80 (or port) for transporting the optical signal (also known as the primary working channel).

The data switch 80 from, for example node 72, is able to receive short reach optical signals at a high speed rate via its high speed 1+1 (1 working and 1 protect) ports. These signals are then forwarded to the transponder 86 which maps the short reach optical signal (of, for example, 1310 nm, on the short reach side of the transponder) into a long reach transport and dense wave division multiplex (DWDM) ready signal (of, for example, 1550 nm, on the long reach side of the transponder). The transponder 86 then forwards the long reach optical signal to the DWDM coupler 82. The DWDM coupler 82 can receive various high speed signals from a number of other optical rings (not shown) and combines the signals on one fiber (such as, for example, the working channel). The signal(s) may then be sent to an optical amplifier 84 which, if needed, amplifies the optical signal without having to convert the signal into and out of (or between) the electrical domain. The long reach optical signal is then received by another optical amplifier 84 and/or another DWDM coupler 82 in another node, such as, for example, node 74.

Therefore, the terminals 22 and 23 from FIG. 1 are no longer needed because the optical ring 70 interfaces directly with the high speed data switch 80 ports. As such, the optical signals may be directly transmitted at speeds of up to OC-192 thereby omitting the need for having to multiplex, at the terminal, traffic of lower granularity.

The conventional terminal based optical ring system 5 is also economically less attractive when compared to a more data centric variation such as the optical communication system 70. By placing OXCs 78 on the short reach side of the transponders 86, wavelength contingency and wavelength detection are eliminated at regeneration sites because the correct signal is always being transmitted for a particular route. Thus, the wavelengths λ1 and λ2 from FIG. 1 would always be traveling in the proper direction without having to utilize the wavelength detectors 27 and 28 described in FIGS. 2 and 3. Also, transponders are more efficient than terminals because they do not need to multiplex fine granularity signals into a coarse granularity signal. Therefore, the regeneration or optical amplification process (which converts and reconverts optical signals into the electrical domain) at nodes may be eliminated. Additionally, since the OXC switches 78 rely on the use of high speed (such as, OC-48, OC-192, OC-192+) interfaces, they do not require further time division multiplexing from traditional terminals. Furthermore, the impact of optical switching fabric loss is removed from the transmission link budget since only the protection traffic is terminated on the OXC 78.

Figure 5:
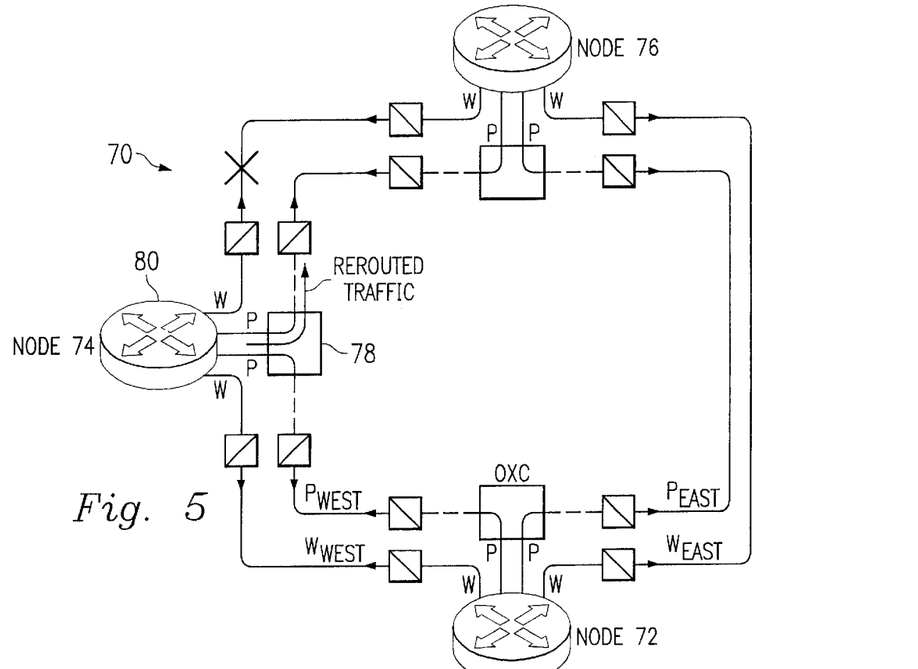
FIG. 5 is a diagrammatic view of a working channel failure in the optical system of the present invention.

The protect channel(s) operate in either a normal operation span switched setting or in a link failure alternate direction setting. FIG. 5 depicts the protection channel(s) from optical communication system 70 operating in a normal operation span switched setting. If equipment failure (such as a laser) was noted (in, for example, data switch 80 at node 74) or if a failure occurred on the link transporting the working channel (such as, for example, the working channel between node 74 and node 76), the traffic for these nodes would be rerouted via the protect channel of node 74. In this manner, the traffic is not degraded and reaches its intended destination. The OXC 78 then monitors, for example, the primary working signal to determine if the failure has recovered. If it has, the working channel is again utilized and the protect channel becomes available.

Figure 6:
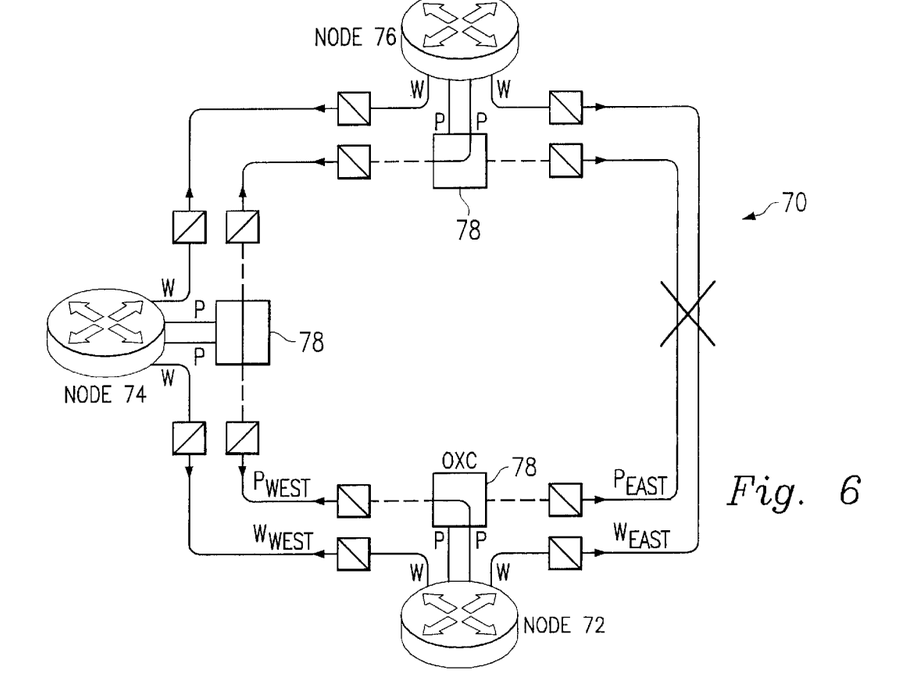
FIG. 6 is a diagrammatic view of an optical line failure in the optical system of the present invention.

FIG. 6 depicts the protection channel(s) from the optical communication system 70 operating in a link failure alternate direction setting. If the entire link between node 72 and node 76 failed, the protection channel P(East) would not be available as described in FIG. 5. Thus, the OXCs 78 at adjacent nodes on each side of the failed link (nodes 72 and 76) would switch (or reroute) the optical signal(s) to the alternate diverse protect port P(West). An optical pass through of the switched optical signal is then configured between any transit nodes (such as node 78) in the optical ring to allow the signal to flow directly between nodes 72 and 76. As such, a restoration path for the working signal is now available.

The OXCs 78 in nodes 72 and 76 monitor the primary working signal to determine if the link has recovered. If it has, the working channel is again utilized and the protect channel becomes available. When this working traffic is rerouted it is done more efficiently than with the conventional optical communication system 5 because the signals do not have to terminate on transit data switches (such as data switch 80 in node 74) as they are transmitted through the network. Additionally, because the signals are traveling at a high speed rate, they do not have to be amplified as they pass through a node.

Figure 7:
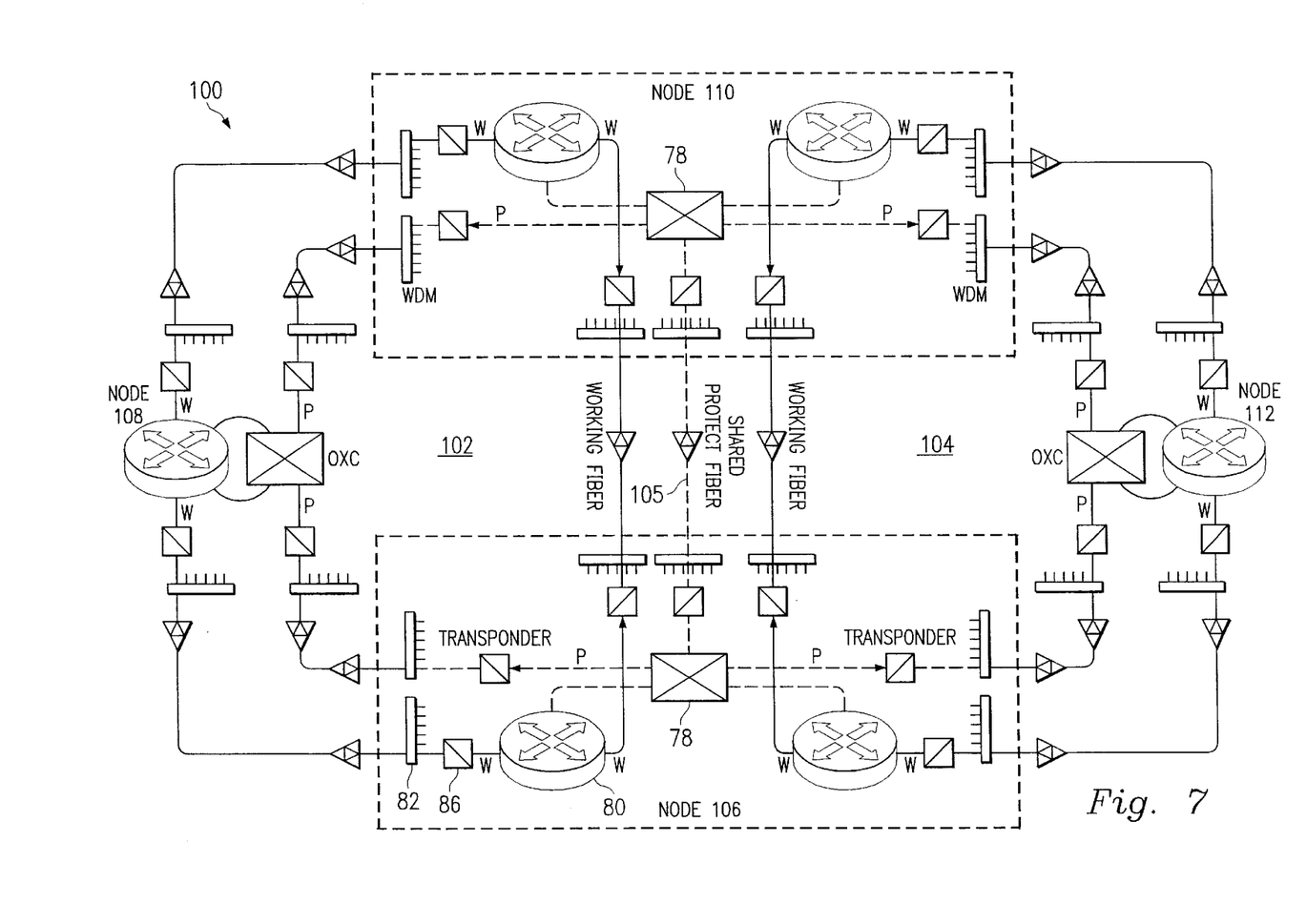
FIG. 7 is a diagrammatic view of interconnected optical rings sharing a protect fiber of the present invention.

FIG. 7 depicts an optical communication system 100 for implementing another embodiment of the present invention. The optical communication system 100 includes a first communication system (optical ring) 102 and a second communication system (optical ring) 104 wherein each ring is similar to system 70 in FIGS. 4–6. These systems 102 and 104, however, are interconnected via the OXCs 78 in nodes 106 and 110 and share a portion of the protect fiber 105. Additionally, all of the equipment (such as an OXC 78, data switches 80, DWDM couplers 82, and transponders 86) are located at the same node (such as node 106).

If a failure occurs on a link transporting the primary working channel in optical ring 102, the protect channel in the optical ring 102 is utilized to transport the optical signal if the protect channel in optical ring 104 (the adjacent optical ring) is not being utilized (since the rings share a portion of the protect fiber). Additionally, if the failure has not recovered and the protect channel in the optical ring 102 is not available, the optical cross connect switching fabrics at adjacent nodes on each side of the failed link, switch the optical signal to an alternate diverse protect channel, if the protect channel in the adjacent optical ring 104 is not being utilized. Rings 102 and 104 cannot use their protect channels at the same time. This does not pose a true problem, however, because the probability of both interconnected rings 102 and 104 needing to utilize their protect channels at the same time is very low. It is important to note that ring 102 can utilize its protect channel while ring 104 is utilizing its working fiber. Additionally, both rings 102 and 104 may concurrently utilize their working fibers. With such a configuration, costs are reduced because both rings 102 and 104 share a portion of their protect fibers and thus, greater efficiencies between the systems 102 and 104 are achieved.

Figure 8:
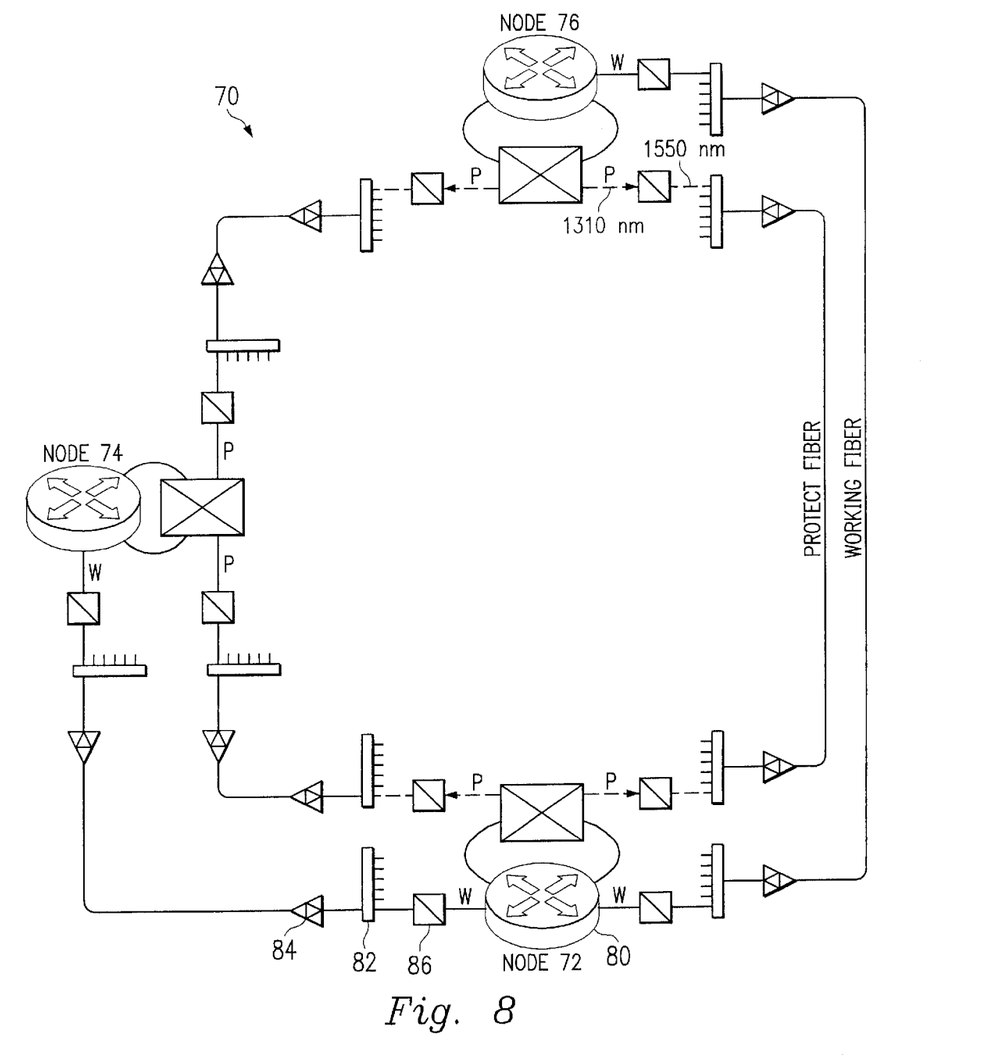
FIG. 8 is a diagrammatic view of an unbalanced optical system of the present invention.

FIG. 8 depicts the optical communication system 70 (described in FIGS. 4–6) for implementing another embodiment of the present invention. In this system, the amount of transmit (i.e. a laser) and receive (i.e. a receiver) equipment may be reduced because balanced systems are not required around the optical ring. Unlike the conventional system 5, which requires a multiplexor at every terminal, system 70 allows the omission of certain equipment (such the DWDM coupler 82, optical amplifier 84, transponder 86, and regenerators) when there are no working demands between nodes. For example, since no working demands currently exist between nodes 74 and 76, DWDM couplers 82, optical amplifiers 84, and transponders 86 do not have to be placed at various sides of the data switches 80. As can be seen, there is no equipment (and thus no working fiber) on the north side of the data switch 80 at node 74 and on the west side of the data switch 80 at node 76. Should the need arise, however, the working fiber and equipment can be quickly provisioned to handle any working demands.

The protect channels between nodes 74 and 76 must still be deployed to enable ring restoration for other failed ring sections. For example, if the entire link between nodes 72 and 76 failed (because, for example, the link was cut), the protect channels between nodes 74 and 76 could carry working signals between nodes 72 and 76. With unbalanced rings, less equipment needs to be deployed and fewer working channels need to be provisioned which greatly reduces system cost and improves the efficiency of the system 70.

Figure 9:
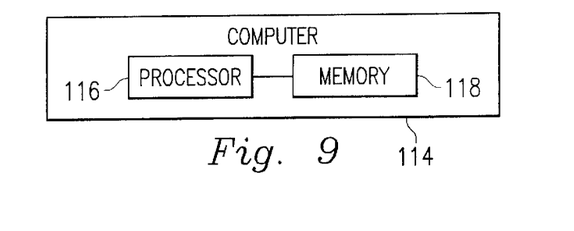
FIG. 9 is a diagrammatic view of a computer of the present invention.

FIG. 9 depicts a computer 114 (which contains a computer program) that comprises a processor 116 and memory 118., The computer 114 may be a personal computer or laptop, or may be part of the OXC 78, the data switch 80, the WDM coupler 82, the optical amplifier 84, the transponder 86, the regenerator and/or any device that can send and receive optical information. Alternatively, the computer 114 may be part of several different elements in the systems 70 and 100. The processor 1166 may be a central processing unit, digital signal processor, microprocessor, microcontroller, microcomputer, and/or any device that manipulates digital information based on programming instructions. The memory 118 may be read-only memory, random access memory, flash memory and/or any device that stores digital information. The memory 118 is coupled to the processor 116 and stores programming instructions that, when read by the processor, cause the processor to perform certain processing operations.

Figure 10:
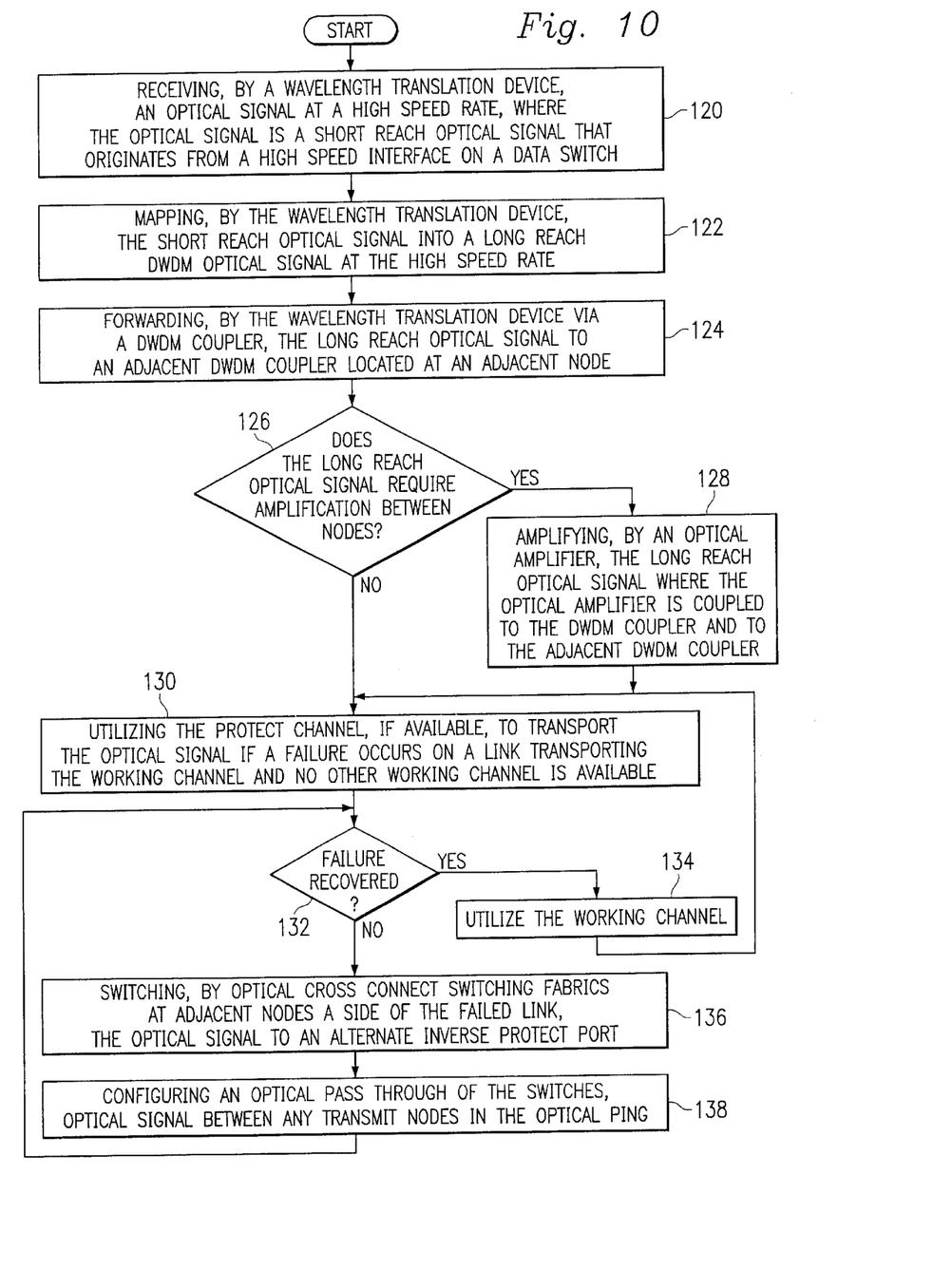
FIG. 10 is a flow chart of a method for transmitting and restoring an optical signal of the present invention.

FIG. 10 describes a method for transmitting an optical signal that may be implemented by the computer 114 of FIG. 8. The method begins at step 120 where a wavelength translation device receives a short reach optical signal at a high speed rate that originated from a high speed interface on a data switch. At step 122, the wavelength translation device maps the short reach optical signal into a long reach DWDM optical signal at the high speed rate. At step 124, the wavelength translation device, via a DWDM coupler forwards the long reach optical signal to an adjacent DWDM coupler located at an adjacent node.

At decision 126, a check is performed to determine if the long reach optical signal requires amplification between the nodes. If it does, the method proceeds to step 128 where an optical amplifier amplifies the long reach signal. From decision 126 and from step 128, the method proceeds to step 130 where the protect channel is utilized, if it is available, to transport the optical signal if a failure occurs on a link transporting the working channel.

At decision 132, a check is performed to determine if the failure has recovered. If it has, the method proceeds to step 134 where the working channel is again utilized. If it has not, the protect channel is not available and the method proceeds to decision 136 where a check is performed to determine if an alternate diverse protect port has been configured. If it has, the method proceeds to decision 132. If it has not, the method proceeds to step 138 where optical cross connect switching fabrics at adjacent nodes on each side of the failed link switch the optical signal to an alternate diverse protect port. At step 140, an optical pass through of the switched optical signal between any transit nodes in the optical ring is configured. The method then proceeds to decision 132 to determine if the working channel can be utilized.

The present invention thus enjoys several advantages. For example, the data switch 80 includes high speed ports that allow traffic of coarse granularity to enter an optical ring with having to be multiplexed. Also, the transponder 86 maps a short reach optical signal into a long reach transport and DWDM ready signal. By utilizing the transponder 86, wavelength detection schemes at regeneration sites are eliminated because the correct signal is always being transmitted for a particular route. Thus, the wavelengths would always be traveling in the proper direction without having to utilize conventional wavelength detectors. As such, wavelength contingency does not occur and the signals do not incur significant power loss as they transit through the optical switching fabric. Further, by placing the OXC switches 78 on the short reach side of the transponders 86, the impact of the optical switching fabric unavailability is removed from the transmission link budget since only the protection traffic is terminated on the OXC 78. Still further, the optical ring can be easily unbalanced by utilizing a different number of working channels between each node. As such, the amount of transmit and receive equipment is reduced.

It is understood that variations may be made in the foregoing without departing from the scope of the present invention. For example, any number and combination of entities such as optical rings, nodes, OXC's, transponders, WDM couplers, optical amplifiers, and regenerators may be used with the present system. Further, in order to improve signal quality, electrical regeneration devices may be used with the present system. Additionally, any number and combination of these entities may be contained in or out of the nodes. Still further, unbalanced rings may be utilized in a system containing shared protection fiber.

It is understood that other modifications, changes and substitutions are intended in the foregoing disclosure and in some instances some features of the disclosure will be employed without corresponding use of other features. Accordingly, it is appropriate that the appended claims be construed broadly and in a manner consistent with the scope of the disclosure.

What is claimed is:

1. A method for transmitting and restoring optical signals in an optical ring, wherein the optical ring comprises a plurality of nodes, each node containing an optical cross connect switching fabric coupled to a data switch, wherein the optical cross connect switching fabric and the data switch are further coupled to a short reach side of a first and second wavelength translation device, respectively, and wherein a long reach side of the second wavelength translation device is coupled to a dense wave division multiplex (DWDM) coupler, and wherein the optical cross connect switching fabric and the data switch include at least one protect channel and at least one working channel, respectively, for transporting the optical signal, the method comprising the steps of:

receiving, by the first wavelength translation device via the protect channel, a first optical signal, wherein the first optical signal is a short reach optical signal and originates from the optical cross connect switching fabric;

receiving, by the second wavelength translation device via the working channel, a second optical signal at a high speed rate, wherein the second optical signal is a short reach optical signal and originates from a high speed interface on the data switch;

mapping, by the second wavelength translation device, the second short reach optical signal into a long reach DWDM optical signal at the high speed rate;

providing the long reach DWDM optical signal to one of a plurality of inputs of the DWDM coupler; and forwarding the long reach optical signal to an adjacent DWDM coupler located at an adjacent node.

2. The method of claim 1 further comprising:

performing at least one of the following steps from the group consisting of:

if the long reach optical signal requires amplification, amplifying, by at least one optical amplifier, the long reach optical signal, wherein the at least one optical amplifier is coupled between the plurality of nodes; and if the long reach optical signal requires improved signal quality, regenerating, by at least one regenerator, the long reach optical signal, wherein the at least one regenerator is coupled between the plurality of nodes.

3. The method of claim 1 further comprising the step of, if a failure occurs on a link transporting the at least one working channel, utilizing the at least one protect channel to transport the optical signals.

4. The method of claim 3 further comprising the step of, if the failure has recovered, utilizing the at least one working channel.

5. The method of claim 3 further comprising the step of, if the failure has not recovered and the at least one protect channel is not available, switching, by optical cross connect switching fabrics at adjacent nodes on each side of the failed link, the optical signal to an alternate diverse protect port.

6. The method of claim 5 further comprising the step of, configuring an optical pass through of the switched optical signal between any transit nodes in the optical ring.

7. The method of claim 5 further comprising the step of, if the failure has recovered, switching the optical signal back to the at least one working channel.

8. A system for transmitting and restoring optical signals in an optical ring, the system comprises:
   optical cross connect switching fabric;
   a data switch;
   a first wavelength translation device configured for receiving, via a protect channel, a first optical signal, wherein the first optical signal is a short reach optical signal and originates from the optical cross connect switching fabric;
   a second wavelength translation device, configured for receiving via a working channel, the second optical signal at a high speed rate, wherein the second optical signal is a short reach optical signal and originates from a high speed interface on the data switch the second wavelength translation device also configured for receiving the second short reach optical signal and mapping the short reach optical signal into a long reach dense wave division multiplex (DWDM) optical signal at the high speed rate; and
   a DWDM coupler for receiving the mapped long reach optical signal into one of a plurality of inputs, and forwarding the received long reach optical signal to an adjacent DWDM coupler located at an adjacent node.

9. The system of claim 8 further comprises at least one of the following from the group consisting of:
   at least one optical amplifier for amplifying the long reach optical signal, wherein the at least one optical amplifier is coupled between the plurality of nodes; and
   at least one regenerator for regenerating the long reach optical signal, wherein the at least one regenerator is coupled between the plurality of nodes.

10. The system of claim 8 further comprises, if a failure occurs on a link transporting the at least one working channel, means for utilizing the at least one protect channel to transport the second optical signal.

11. The system of claim 10 further comprises, if the failure has recovered, means for utilizing the at least one working channel.

12. The system of claim 10 further comprises:
   optical cross connect switching fabrics at adjacent nodes on each side of the failed link; for switching the second optical signal to an alternate diverse protect port.

13. The system of claim 12 further comprises means for configuring an optical pass through of the switched optical signal between any transit nodes in the optical ring.

14. The system of claim 12 further comprises, if the failure has recovered, means for switching the second optical signal back to the at least one working channel.

15. The method of claim 1 further comprising
   mapping, by the first wavelength translation device, the first short reach optical signal into a second long reach DWDM optical signal;
   providing the second long reach DWDM optical signal to one of a plurality of inputs of a second DWDM coupler; and
   forwarding the second long reach optical signal to another adjacent DWDM coupler located at the adjacent node.

16. A system for transmitting and restoring an optical signal in an optical communication system, wherein the optical communication system comprises an optical ring coupled to an adjacent optical ring, the system comprising:
   a data switch;
   an optical cross connect switching fabric coupled to the data switch,
   a first wavelength translation device coupled to the optical cross connect via a first channel;
   a second wavelength translation device coupled to the data switch via a second channel;
   a first dense wave division multiplex (DWDM) coupled to a long reach side of the first wavelength translation device; and
   a second DWDM coupled to a long reach side of the second translation device;
   wherein the first wavelength translation device is configured for receiving the short reach optical signals at a high speed rate from a high speed interface on the data switch and for mapping the short reach optical signal into a long reach DWDM optical signal at the high speed rate.

17. The system of claim 16 further comprising:
   means for coupling the long reach DWDM optical signal with a second long reach DWDM optical signal; and
   means for forwarding the coupled long reach optical signals to an adjacent DWDM coupler located at an adjacent node.

18. The system of claim 16 further comprising:
   at least one optical amplifier for amplifying the long reach optical signal if the long reach optical signal requires amplification.

19. The system of claim 16 further comprising:
   at least one regenerator for regenerating the long reach optical signal if the long reach optical signal requires improved signal quality.

20. The system of claim 16 further comprising:
   the data switch configured for utilizing the second channel in the optical ring to transport the optical signal if a failure occurs.

* * * * *